United States Patent
Loupos et al.

(10) Patent No.: US 11,323,883 B2
(45) Date of Patent: *May 3, 2022

(54) PATTERN DRIVEN SELECTIVE SENSOR AUTHENTICATION FOR INTERNET OF THINGS

(71) Applicant: Inlecom Systems Limited, London (GB)

(72) Inventors: Konstantinos Loupos, Athens (GR); Gerasimos Kouloumpis, London (GB); Alexander Papageorgiou, Athens (GR); Takis Katsoulakos, W. Sussex (GB); Patrick J. O'Sullivan, Dublin (IE)

(73) Assignee: INLECOM SYSTEMS LIMITED, London (GB)

( * ) Notice: Subject to any disclaimer, the term of this patent is extended or adjusted under 35 U.S.C. 154(b) by 94 days.

This patent is subject to a terminal disclaimer.

(21) Appl. No.: 16/588,984

(22) Filed: Sep. 30, 2019

(65) Prior Publication Data

US 2021/0099881 A1 Apr. 1, 2021

(51) Int. Cl.
*H04W 12/088* (2021.01)
*H04W 12/06* (2021.01)
*H04L 29/06* (2006.01)

(52) U.S. Cl.
CPC ......... *H04W 12/088* (2021.01); *H04L 63/029* (2013.01); *H04W 12/06* (2013.01)

(58) Field of Classification Search
CPC .................................................. H04W 12/122
See application file for complete search history.

(56) References Cited

U.S. PATENT DOCUMENTS

| 10,735,346 B2* | 8/2020 | Nolan | H04L 47/821 |
| 2009/0328225 A1* | 12/2009 | Chambers | G06F 21/44 |
| | | | 726/26 |

(Continued)

OTHER PUBLICATIONS

McAfee (Protecting the Internet of Things, Oct. 2017, pp. 1-11). (Year: 2017).*

(Continued)

*Primary Examiner* — Luu T Pham
*Assistant Examiner* — James J Wilcox
(74) *Attorney, Agent, or Firm* — CRGO Global; Steven M. Greenberg

(57) ABSTRACT

Internet-of-Things (IoT) prioritized sensor authentication management includes receiving in an IoT gateway different packets of data from different sensors over a computer communications network. For each received packet of data from a corresponding one of the different sensors, the received packet of data is compared to a pattern associated with the corresponding one of the different sensors. On the condition that the received packet of data is within a threshold of similarity to the pattern, a sensor value may be extracted from the received packet of data and transmitted to a sensor monitor. But otherwise, the received packet of data is placed into quarantine in memory of the IoT gateway, authentication of the corresponding one of the different sensors is performed, and in response to the authentication, the packet is released from quarantine, the sensor value extracted from the received packet of data and transmitted to the sensor monitor.

15 Claims, 2 Drawing Sheets

(56) References Cited

U.S. PATENT DOCUMENTS

| | | | |
|---|---|---|---|
| 2015/0302725 A1* | 10/2015 | Sager | G08B 25/005 |
| | | | 340/870.16 |
| 2016/0197999 A1* | 7/2016 | Chun | H04L 67/2804 |
| | | | 709/217 |
| 2016/0285717 A1* | 9/2016 | Kim | H04L 43/065 |
| 2018/0124030 A1 | 5/2018 | Bima | |
| 2018/0131689 A1 | 5/2018 | Vasters et al. | |
| 2018/0253569 A1* | 9/2018 | Swierk | G06F 21/86 |
| 2018/0264347 A1* | 9/2018 | Tran | A63B 71/145 |
| 2018/0276842 A1 | 9/2018 | Seaman et al. | |
| 2018/0341760 A1* | 11/2018 | Frempong | G06F 21/32 |
| 2019/0109820 A1* | 4/2019 | Clark | H04L 9/16 |
| 2019/0138749 A1* | 5/2019 | Kim | G06F 21/6254 |
| 2019/0158353 A1* | 5/2019 | Johnson | H04L 61/2514 |
| 2019/0317934 A1* | 10/2019 | Jentzsch | G06F 16/2365 |
| 2020/0036792 A1* | 1/2020 | Palin | H04L 67/12 |
| 2020/0244653 A1* | 7/2020 | Eichelberger | H04W 12/065 |

OTHER PUBLICATIONS

Rao et al "Priority Based Optimal Resource Reservation Mechanism in Constrained Networks for IOT Applications," IEEE WISPNET 2016 Conference, pp. 1228-1233 (Year: 2016).*

Xie et al "Design of Embedded Gateway Software Framework for Heterogenous Networks Interconnection," 2011 International Conference on Electronics and Optoelectronics (ICEOE 2011), pp. 306-309 (Year: 2011).*

* cited by examiner

PATTERN DRIVEN SELECTIVE SENSOR AUTHENTICATION FOR INTERNET OF THINGS

BACKGROUND OF THE INVENTION

Field of the Invention

The present invention relates to the field of Internet of Things (IoT) and more particular to the management of data received from different IoT sensors.

Description of the Related Art

IoT refers to a vast web of connected devices over the global Internet by way of the instrumentation of ordinary machines ranging from toasters to automobiles. Literally, anything that can be powered on or off, once instrumented for IoT permits one-way or two-way interactions over the Internet. These interactions can range from merely reporting a status of a sensor, for instance an ordinary value, to receiving directives effectively remotely operating an IoT enabled device. While the advantages of IoT enabling a machine are substantial, those advantages come at a cost—the creation of a security vulnerability in the machine.

In this regard, as a stand-alone unit, a machine is impervious to remote threats by and large. But, just like any other connected personal computer, a machine configured for IoT becomes vulnerable to remote threats including network intrusions. As well, to the extent that the communications path between an IoT enabled machine and an IoT gateway becomes accessible by a malevolent actor, the malevolent actor may spoof the identity of the IoT enabled machine so as to report false values to the IoT gateway as if the values were correctly reported by the IoT enabled machine—the so-called man in the middle attack. Password protection provides only limited relief from a man-in-the-middle attack in so far as the processing of a password for every value received from every coupled IoT enabled machine in an IoT gateway can be substantially resource intensive so as to allow for a denial of service (DoS) style attack upon the IoT gateway.

BRIEF SUMMARY OF THE INVENTION

Embodiments of the present invention address deficiencies of the art in respect to IoT sensor authentication and provide a novel and non-obvious method, system and computer program product for IoT prioritized sensor authentication management. In an embodiment of the invention, an IoT prioritized sensor authentication management method includes receiving in an IoT gateway different packets of data from different sensors over a wireless computer communications network. For each received packet of data from a corresponding one of the different sensors, the received packet of data is compared to a pattern associated with the corresponding one of the different sensors, for instance a previously stored range of values associated with the corresponding one of the sensors, or a previously computed average value associated with the corresponding one of the sensor, to name two examples. On the condition that the received packet of data is within a threshold of similarity to the pattern, a sensor value may be extracted from the received packet of data and transmitted to a sensor monitor. But otherwise, the received packet of data is placed into quarantine in memory of the IoT gateway, authentication of the corresponding one of the different sensors is performed, and in response to the authentication, the packet is released from quarantine, the sensor value extracted from the received packet of data and transmitted to the sensor monitor.

In one aspect of the embodiment, the pattern is an average sensor value for the corresponding one of the different sensors. In another aspect of the embodiment, the pattern is a set of previously received sensor values for the corresponding one of the different sensors within a range of sensor values such that similarity with the pattern comprises a value falling within the range. In yet another aspect of the embodiment, a set of priorities is assigned to each of the different sensors, and for each of the different sensors with a threshold priority assigned thereto, upon receipt of packet data therefrom, the sensor value is extracted and transmitted to the sensor monitor without performing authentication thereon.

In even yet another aspect of the embodiment, irrespective of whether or not the received packet of data for the one of the different sensors is within a threshold of similarity to the pattern, responsive to a threshold lapse of time between received packet data from one of the different sensors, the placing into quarantine and the authentication of the one of the different sensors is performed. Alternatively, or additionally, irrespective of whether or not the received packet of data for the one of the different sensors is within a threshold of similarity to the pattern, responsive to a threshold number of instances of between received packet data from one of the different sensors, the placing into quarantine and the authentication of the one of the different sensors is performed.

In another embodiment of the invention, an IoT sensor gateway is configured to perform prioritized sensor authentication management. The system includes a host computing system that has one or more computing devices, each with memory and at least one processor, and that is wirelessly coupled to a multiplicity of IoT configured sensors. The system further includes a sensor authentication module that includes computer program instructions executing in the memory of the host computing system. The program instructions, during execution, receive in the host computing system different packets of data from different ones of the IoT configured sensors over a wireless computer communications network and for each received packet of data from a corresponding one of the different ones of the IoT sensors, compares the received packet of data to a pattern associated with the corresponding one of the different ones of the IoT configured sensors.

Finally, the program instructions, on the condition that the received packet of data is within a threshold of similarity to the pattern, for instance, when the sensor value falls within a previously defined range of values or is within a threshold of an average value for the corresponding one of the IoT configured sensors, extract a sensor value from the received packet of data and transmit the sensor value to a sensor monitor. But, otherwise, the program instructions place the received packet of data into quarantine in memory of the host computing system, perform authentication of the corresponding one of the different ones of the IoT configured sensors and, in response to the authentication releasing the packet from quarantine, extract the sensor value from the received packet of data and transmit the sensor value to the sensor monitor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for IoT prioritized sensor authentication management. In accordance with an embodiment of the invention, a multiplicity of different IoT sensors report sensed values through an IoT gateway for consumption by an IoT monitoring system. The IoT gateway, upon receipt of the values, diverts only prioritized ones of the sensed values for sensor authentication before routing those values to the IoT monitoring system, while unprioritized ones of the sensed values are routed to the IoT monitoring system without undergoing sensor authentication. In this regard, the IoT gateway, upon receiving a value from a corresponding IoT sensor, determines if the value is prioritized based upon a comparison to a previous pattern of values received from the corresponding sensor. To the extent that the value deviates from the previous pattern, the value is prioritized for authentication. Otherwise, the IoT gateway averts the diversion of the received value so that the resource costly process of IoT sensor authentication is performed only for prioritized IoT sensors considered unlikely to have been the subject of a malicious spoofing.

Figure 1:
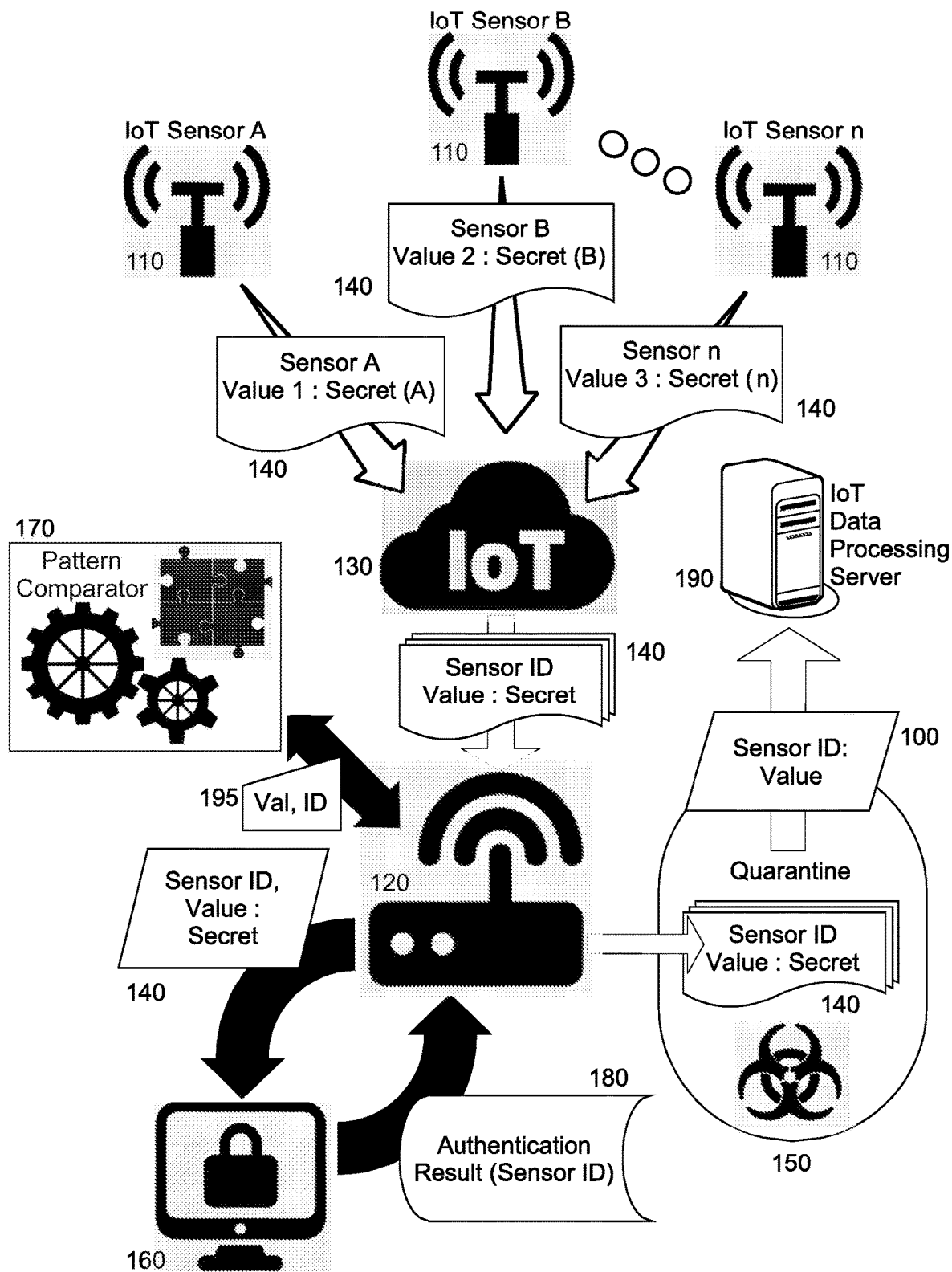
FIG. 1 is pictorial illustration of a process for IoT prioritized sensor authentication management.

In further illustration, FIG. 1 pictorially shows a process for IoT prioritized sensor authentication management. As shown in FIG. 1, multiple different IoT sensors 110 communicate data packets 140 over wireless IoT network 130 to an IoT gateway 120. Each of the data packets 140 includes not only a sensed value that had been sensed by a corresponding one of the IoT sensors 110, but also a shared secret and an identification of the corresponding one of the IoT sensors 110. The IoT gateway 120, upon receiving each one of the data packets 140, can place ones of the data packets 140 into a quarantine 150. Concurrently, the IoT gateway 120 provides the data packet 140 to an authentication processor 160 executing separately from the IoT gateway in its own process address space, and optionally, in a completely separate host computing system.

The authentication processor 160 upon receiving the data packet 140, extracts therefrom the both the identifier of the corresponding one of the IoT sensors 110, and the encapsulated secret. The authentication processor 160 then processes the secret to determine whether or not the source of the data packet 140 is the corresponding one of the IoT sensors 110. The authentication processor 160 may perform the authentication according to a simple matching of decryption of the shared secret utilizing a symmetric encryption key known to be associated with the corresponding one of the IoT sensors 110 and used by the corresponding one of the IoT sensors 110 to encrypt the shared secret. More complicated modes of authentication may also be performed in the authentication processor 160, however, including decrypting of the shared secret that had been encrypted with a private key of an asymmetric public-private key pair of the corresponding one of the IoT sensors 110, utilizing the public key published for the corresponding one of the IoT sensors 110.

Ultimately, the authentication processor 160 returns and authentication result 180 to the IoT gateway. The IoT gateway 120, upon receiving an authentication result 180 from the authentication processor for a corresponding one of the IoT sensors 110 and an associated received one of the data packets 140, determines of the authentication result 180 serves to authenticate the corresponding one of the IoT sensors 110 as the source of the data packet 140. If not, the IoT gateway 120 discards the data packet 140 from the quarantine 150 without forwarding the data packet 140 to the IoT monitor 190. But, if the authentication result 180 confirms the authenticity of the data packet 140 as having been received from the corresponding one of the IoT sensors 110, the IoT gateway 120 directs the release from the quarantine 150 of the data packet 140 and provides to the IoT monitor 190 value data 100 including the value of the data packet and an identifier of the corresponding one of the IoT sensors 110.

Of note, the IoT gateway 120 provides the data packet 140 to an authentication processor 160 only on the occasion in which the data packet 140 is determined to have priority. In this regard, the data packet 140 is determined to have priority on the occasion that a value in the data packet 140 matches a pattern such as being within a threshold value of an average of previously reported values of the corresponding one of the IoT sensors 110, or within a range of previously reported values of the corresponding one of the IoT sensors 110. To that end, a pattern comparator 170 receives from the IoT gateway 120 for each received data packet encapsulated data 195 including a value and an identifier of the corresponding one of the IoT sensors 110. The pattern comparator 170 in turn compares the value to a known pattern of values of the corresponding one of the IoT sensors 110.

To the extent that the value in the encapsulated data 195 falls outside of a range of values previously recorded for the corresponding one of the IoT sensors 110, or outside of a threshold distance from an average value of the values previously recorded for the corresponding one of the IoT sensors 110, the data packet is determined to have priority. Consequently, the IoT gateway 120 provides the data packet to the IoT authorization processor 160 for processing. But, on the occasion that the pattern comparator 170 determines that the encapsulated data 195 does not fall outside of the range of values, or outside of a threshold distance from the average value, then the data packet is determined to lack priority and the IoT gateway 120 provides to the IoT monitor 190 value data 100 including the value of the data packet 140 and an identifier of the corresponding one of the IoT sensors 110 without first providing the data packet 140 to the authentication processor 160, the matching of the encapsulated data 195 to the known pattern of values essentially supplanting or complimenting an authentication process.

Figure 2:
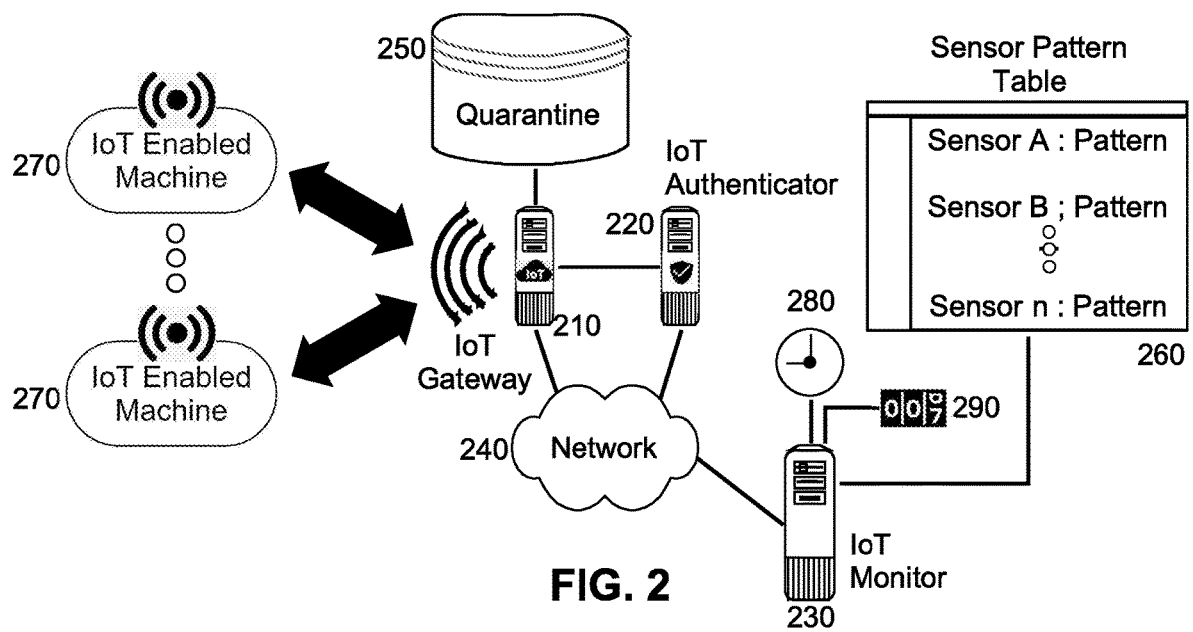
FIG. 2 is a schematic illustration of an IoT data processing system configured for prioritized sensor authentication management; and, FIG. 3 is a flow chart illustration a process for IoT prioritized sensor authentication management.

The process described in connection with FIG. 1 may be implemented in an IoT data processing system. In further illustration, FIG. 2 schematically shows an IoT data processing system configured for prioritized sensor authentication management. The system includes an IoT gateway 210, wirelessly communicatively coupled to a multiplicity of different IoT enabled machines 270. Each of the IoT enabled machines 270 transmits data packets to the IoT gateway 210, the data packets encapsulating each of an identifier of the corresponding one of the IoT enabled machines 270, a value sensed in the corresponding one of the IoT enabled machines 270, and a shared secret.

The IoT gateway 210 is a process executing in a host computing device (or multiple different host computing devices) and is communicatively coupled over wire bound network 240 to an IoT monitor 230. The IoT gateway 210 serves as a collection point for data packets wirelessly received from the IoT enabled machines 270 and as a distributor of the sensed values within the data packets to the IoT monitor 230. The IoT monitor 230, in turn, is a process executing in memory of a host computer (or set of host computers) that is adapted to receive sensed values from the IoT enabled machines 270 by way of the IoT gateway 210, and to process the sensed values in connection with corresponding ones of the IoT enabled machines 270. The processing performed by the IoT monitor 230 ranges from merely displaying the sensed values in association with corresponding ones of the IoT enabled machines 270, to performing computations upon the sensed values for display in terms of trending values, predicted values or values which are determined to exceed or fall short of a threshold indicative of an anomalous condition.

Importantly, the IoT gateway 210 also is communicatively coupled to an IoT authenticator 220 and to a quarantine data store 250. The IoT authenticator 220 is a process adapted to authenticate received data packets from respective ones of the IoT enabled machines 270 as having been authentically transmitted by the respective ones of the IoT enabled machines 270 to the IoT gateway 210. The IoT authenticator 220 as a process may execute within the same computing device as the IoT gateway 210, or in a separate computing device as shown herein. But, in all circumstances, the IoT authenticator 220 executes in a process address space that is different than that of the IoT gateway 210.

In operation, the IoT gateway 210 receives a data packet from a corresponding one of the IoT enabled machines 270 and determines whether or not the data packet is to be prioritized. In this regard, a value encapsulated by the data packet is compared to an entry in a sensor pattern table 260 for a corresponding one of the IoT enabled machines 270 in order to determine whether or not the value falls within a previously observed range of values for the corresponding one of the IoT enabled machines 270, or whether or not the value is within a threshold of an average value of previously observed values for the corresponding one of the IoT enabled machines 270. To the extent that the value falls outside of a previously observed range of values for the corresponding one of the IoT enabled machines 270, or the value is not within a threshold of an average value of previously observed values for the corresponding one of the IoT enabled machines 270, the data packet is determined to have priority and is submitted to the IoT authenticator 220 for authentication. Otherwise, the data packet is routed to the IoT monitor 230 bypassing the IoT authenticator 220.

Optionally, a timer 280 may be maintained for each of the IoT enabled machines 270. As a threshold amount of time has elapsed for each one of the IoT enabled machines 270, a data packet received from the one of the IoT enabled machines 270 is determined to be prioritized irrespective of whether or not the value is within a threshold of an average value or a range of previously observed values for the corresponding one of the IoT enabled machines 270. Instead, owing to the lapse of time, the data packet is placed into the quarantine data store 250 and provided to the IoT authenticator 220. Likewise, a counter 290 may be maintained for each of the IoT enabled machines 270. As a threshold number of data packets have been received for each one of the IoT enabled machines 270, a data packet received from the one of the IoT enabled machines 270 is determined to be prioritized irrespective of whether or not the value is within a threshold of an average value or a range of previously observed values for the corresponding one of the IoT enabled machines 270. Instead, owing to the number of data packets previously received for the one of the IoT enabled machines 270, the data packet is placed into the quarantine data store 250 and provided to the IoT authenticator 220.

In any event, once a data packet is determined to have priority, the IoT gateway 210 provides either the complete data packet to the IoT authenticator 220, or the IoT gateway 210 extracts from the data packet an identifier for the corresponding one of the IoT enabled machines 270, and a shared secret. The shared secret can be an encrypted value encrypted with a symmetric key known both to the corresponding one of the IoT enabled machines 270 and the IoT authenticator 220. Alternatively, the shared secret can be an encrypted value encrypted with an asymmetric key known only to the corresponding one of the IoT enabled machines 270, such that the shared secret can be decrypted using a public key of the corresponding one of the IoT enabled machines 270 known to the IoT authenticator 220. In either circumstance, the IoT authenticator 220 is enabled to authenticate the source of a data packet when the shared secret is confirmed in the IoT authenticator 220. Upon authentication, the value within the data packet is discarded from the quarantine 250 and provided to the IoT monitor 230 for further processing. Otherwise, the data packet is discarded from the quarantine 250, but suppressed for further processing in the IoT monitor 230.

Figure 3:
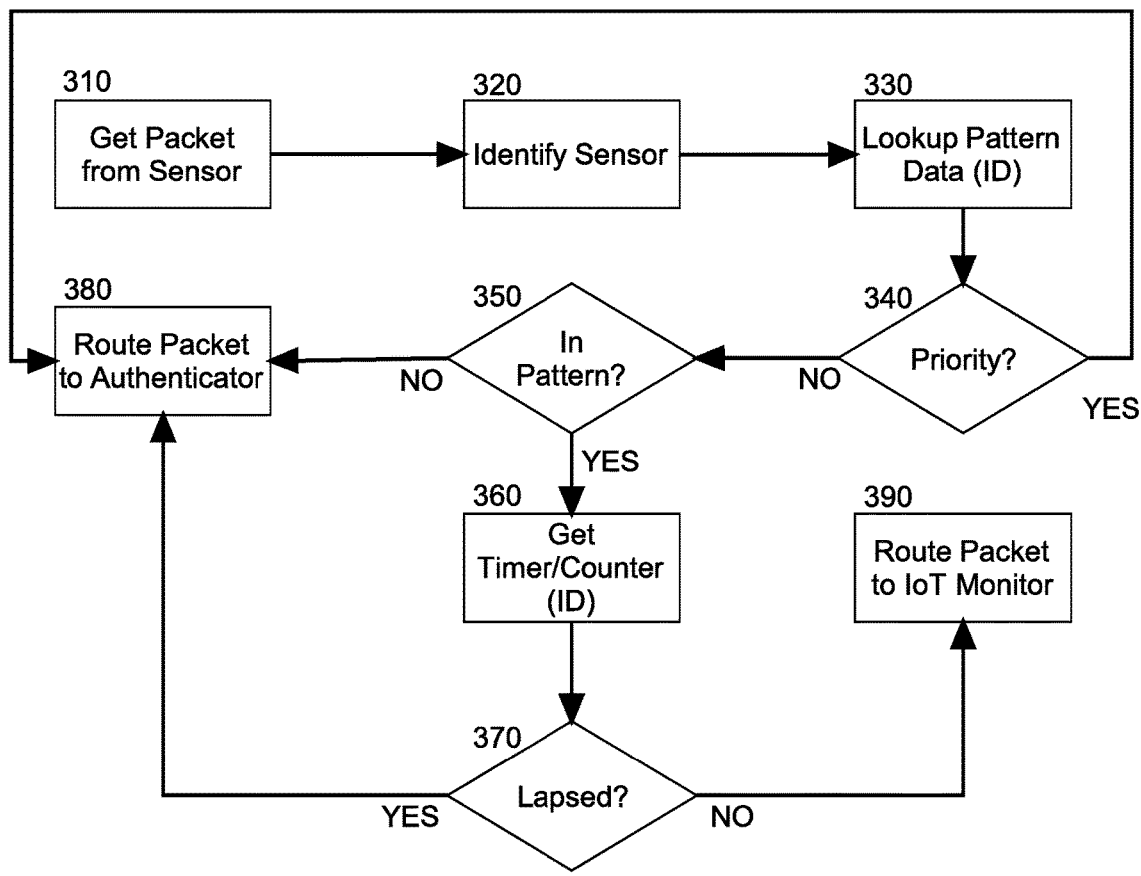

In even yet further illustration of the operation of the IoT gateway 210, FIG. 3 is a flow chart illustration a process for IoT prioritized sensor authentication management. Beginning in block 310, a packet is received from an IoT sensor 310. In block 320, the IoT sensor is identified and in block 330, a database is queried with the identifier for the IoT sensor to locate a record therein that includes a pattern of previously received values for the IoT sensor. In decision block 340, it is determined if a static, predetermined indication of priority is included in the record. If so, the data packet is deemed to have priority and is routed to the IoT authenticator in block 380. Otherwise, the process continues to decision block 350.

In decision block 350, it is determined whether or not a value in the data packet falls within a range of values of the record, or an average value of previously observed values for the IoT sensor in the record. If not, the data packet is considered to have priority and the data packet is routed to the IoT authenticator in block 380. Otherwise, in block 360, a counter or timer value is retrieved in block 360 and in decision block 370, it is determined if the counter or timer has lapsed. If so, the data packet is deemed to be of priority and the data packet is routed to the IoT authenticator.

Otherwise, the data packet lacks prioritization and in block 390, the data packet is routed to the IoT monitor without authentication.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An Internet of Things (IoT) prioritized sensor authentication management method comprising:
    receiving in an IoT gateway different packets of data from different sensors over a wireless computer communications network;
    assigning a set of priorities to each of the different sensors;
    for each of the different sensors with a threshold priority assigned thereto, upon receipt of packet data therefrom, extracting the sensor value and transmitting the sensor value to the sensor monitor without performing authentication thereon, and, for each received packet of data from a corresponding one of the different sensors, determining if the packet of data is prioritized for authentication based upon comparing the received packet of data to a pattern associated with the corresponding one of the different sensors and determining priority in response to a deviation of the packet of data from a previous pattern of values for the corresponding one of the different sensors; and,
    on condition that the received packet of data is determined not to be averting authentication of the corresponding one of the different sensors and instead extracting a sensor value from the received packet of data and transmitting the sensor value to a sensor monitor, and
    on condition that the received packet of data is determined to be prioritized, placing the received packet of data into quarantine in memory of the IoT gateway, performing authentication of the corresponding one of the different sensors and responsive to the authentication releasing the packet from quarantine, extracting the sensor value from the received packet of data and transmitting the sensor value to the sensor monitor.

2. The method of claim 1, wherein the pattern is an average sensor value for the corresponding one of the different sensors.

3. The method of claim 1, wherein the pattern is a set of previously received sensor values for the corresponding one of the different sensors within a range of sensor values such that similarity with the pattern comprises a value falling within the range.

4. The method of claim 1, further comprising responding to a threshold lapse of time between received packet data from one of the different sensors, by performing the placing into quarantine and the authentication of the one of the different sensors, irrespective of whether or not the received packet of data for the one of the different sensors is within a threshold of similarity to the pattern.

5. The method of claim 1, further comprising responding to a threshold number of instances of between received packet data from one of the different sensors, by performing the placing into quarantine and the authentication of the one of the different sensors, irrespective of whether or not the received packet of data for the one of the different sensors is within a threshold of similarity to the pattern.

6. An Internet of Things (IoT) sensor gateway configured to perform prioritized sensor authentication management, the system comprising:
  a host computing system comprising one or more computing devices, each with memory and at least one processor, and wirelessly coupled to a multiplicity of IoT configured sensors; and,
  a sensor authentication module comprising computer program instructions executing in the memory of the host computing system, the program instructions performing:
  receiving in the host computing system different packets of data from different ones of the IoT configured sensors over a wireless computer communications network;
  assigning a set of priorities to each of the different sensors;
  for each of the different sensors with a threshold priority assigned thereto, upon receipt of packet data therefrom, extracting the sensor value and transmitting the sensor value to the sensor monitor without performing authentication thereon, and, for each received packet of data from a corresponding one of the different sensors, determining if the packet of data is prioritized for authentication based upon comparing the received packet of data to a pattern associated with the corresponding one of the different sensors and determining priority in response to a deviation of the packet of data from a previous pattern of values for the corresponding one of the different sensors; and,
  on condition that the received packet of data is determined not to be prioritized averting authentication of the corresponding one of the different sensors and instead extracting a sensor value from the received packet of data and transmitting the sensor value to a sensor monitor, and on condition that the received packet of data is determined to be prioritized, placing the received packet of data into quarantine in memory of the IoT gateway, performing authentication of the corresponding one of the different sensors and responsive to the authentication releasing the packet from quarantine, extracting the sensor value from the received packet of data and transmitting the sensor value to the sensor monitor.

7. The system of claim 6, wherein the pattern is an average sensor value for the corresponding one of the different ones of the IoT configured sensors.

8. The system of claim 6, wherein the pattern is a set of previously received sensor values for the corresponding one of the different ones of the IoT configured sensors within a range of sensor values such that similarity with the pattern comprises a value falling within the range.

9. The system of claim 6, wherein the program instructions further perform responding to a threshold lapse of time between received packet data from one of the different sensors, by performing the placing into quarantine and the authentication of the one of the different sensors, irrespective of whether or not the received packet of data for the one of the different sensors is within a threshold of similarity to the pattern.

10. The system of claim 6, wherein the program instructions further perform responding to a threshold number of instances of between received packet data from one of the different sensors, by performing the placing into quarantine and the authentication of the one of the different sensors, irrespective of whether or not the received packet of data for the one of the different sensors is within a threshold of similarity to the pattern.

11. A computer program product for Internet of Things (IoT) prioritized sensor authentication management, the computer program product including a non-transitory computer readable storage medium having program instructions embodied therewith, the program instructions executable by a device to cause the device to perform a method including:
  receiving in an IoT gateway different packets of data from different sensors over a wireless computer communications network;
  assigning a set of priorities to each of the different sensors;
  for each of the different sensors with a threshold priority assigned thereto, upon receipt of packet data therefrom, extracting the sensor value and transmitting the sensor value to the sensor monitor without performing authentication thereon, and, for each received packet of data from a corresponding one of the different sensors, determining if the packet of data is prioritized for authentication based upon comparing the received packet of data to a pattern associated with the corresponding one of the different sensors and determining priority in response to a deviation of the packet of data from a previous pattern of values for the corresponding one of the different sensors; and,
  on condition that the received packet of data is determined not to be prioritized averting authentication of the corresponding one of the different sensors and instead extracting a sensor value from the received packet of data and transmitting the sensor value to a sensor monitor, and on condition that the received packet of data is determined to be prioritized, placing the received packet of data into quarantine in memory of the IoT gateway, performing authentication of the corresponding one of the different sensors and responsive to the authentication releasing the packet from quarantine, extracting the sensor value from the received packet of data and transmitting the sensor value to the sensor monitor.

12. The computer program product of claim 11, wherein the pattern is an average sensor value for the corresponding one of the different sensors.

13. The computer program product of claim 11, wherein the pattern is a set of previously received sensor values for the corresponding one of the different sensors within a range of sensor values such that similarity with the pattern comprises a value falling within the range.

14. The computer program product of claim 11, wherein the method further comprises responding to a threshold lapse of time between received packet data from one of the different sensors, by performing the placing into quarantine and the authentication of the one of the different sensors, irrespective of whether or not the received packet of data for the one of the different sensors is within a threshold of similarity to the pattern.

15. The computer program product of claim 11, wherein the method further comprises responding to a threshold number of instances of between received packet data from one of the different sensors, by performing the placing into quarantine and the authentication of the one of the different sensors, irrespective of whether or not the received packet of data for the one of the different sensors is within a threshold of similarity to the pattern.

* * * * *